June 3, 1930.                C. H. LANDERS                1,761,926
                       PROCESS OF MAKING BEARINGS
                  Filed Jan. 23, 1928       7 Sheets-Sheet 1
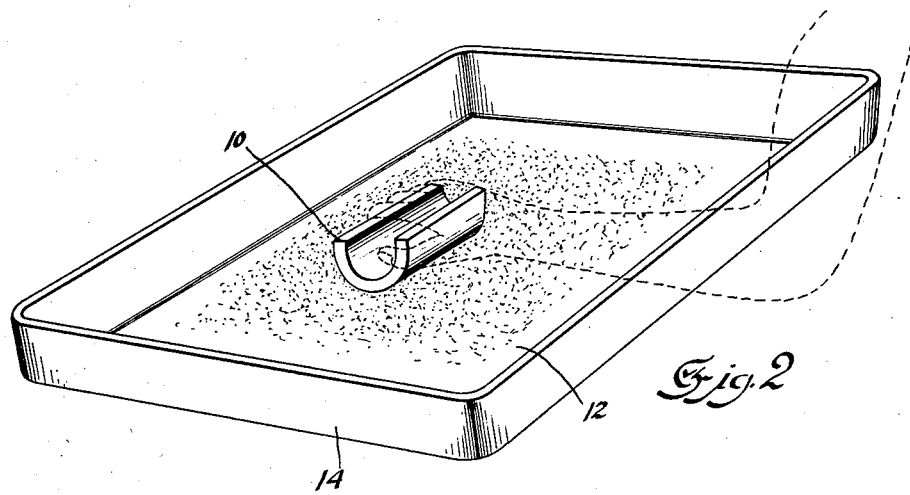
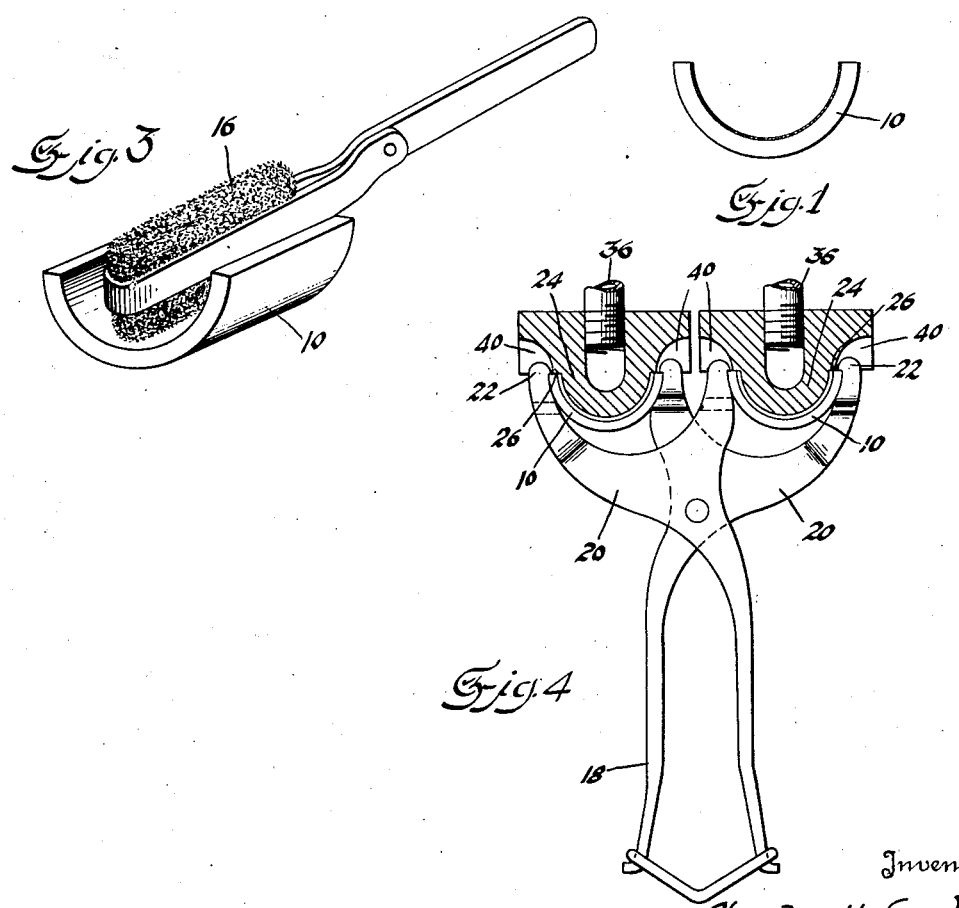
Inventor
Charles H. Landers
By Blackmore, Spencer & Finch
Attorneys

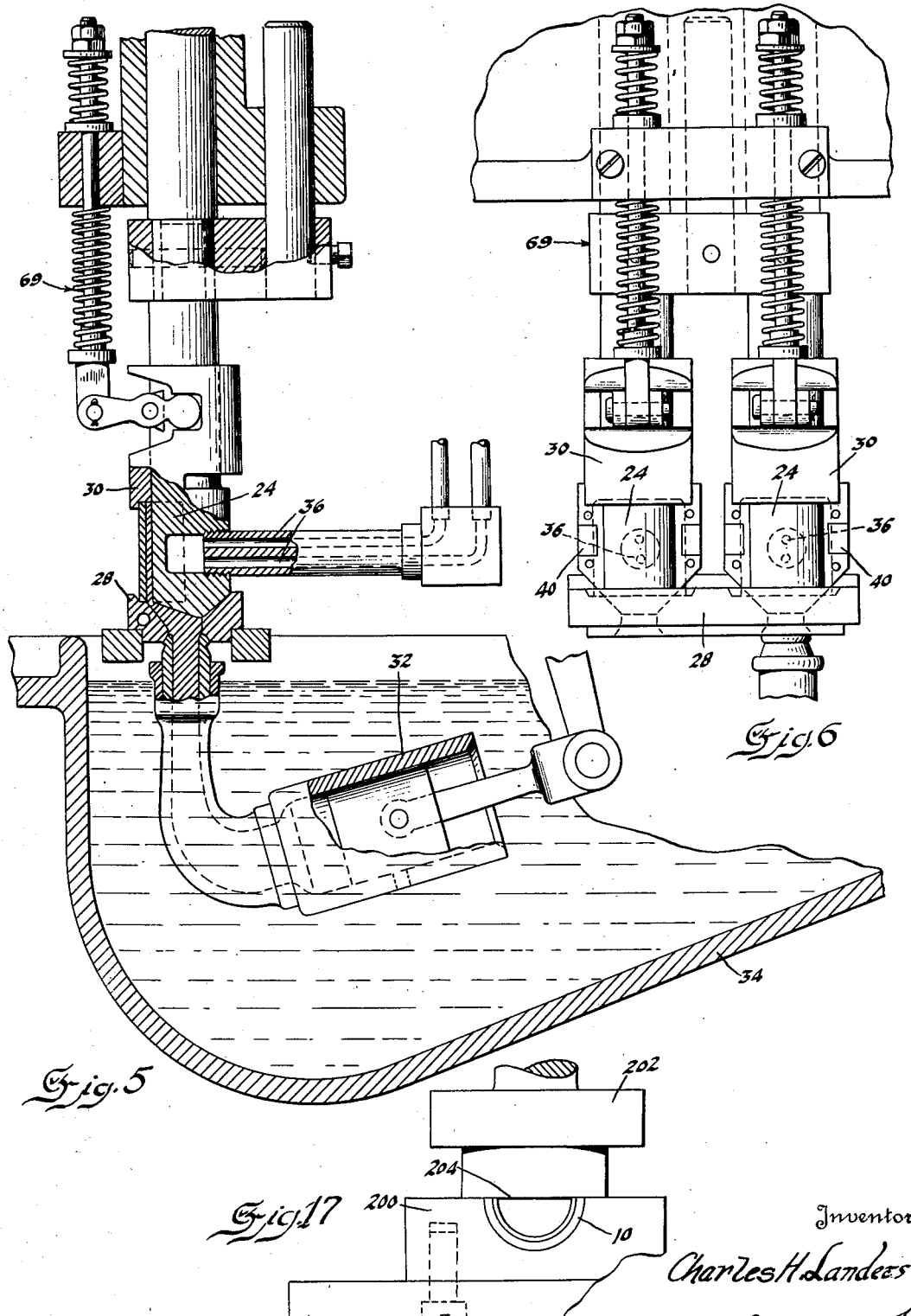

June 3, 1930.    C. H. LANDERS    1,761,926
PROCESS OF MAKING BEARINGS
Filed Jan. 23, 1928    7 Sheets-Sheet 3
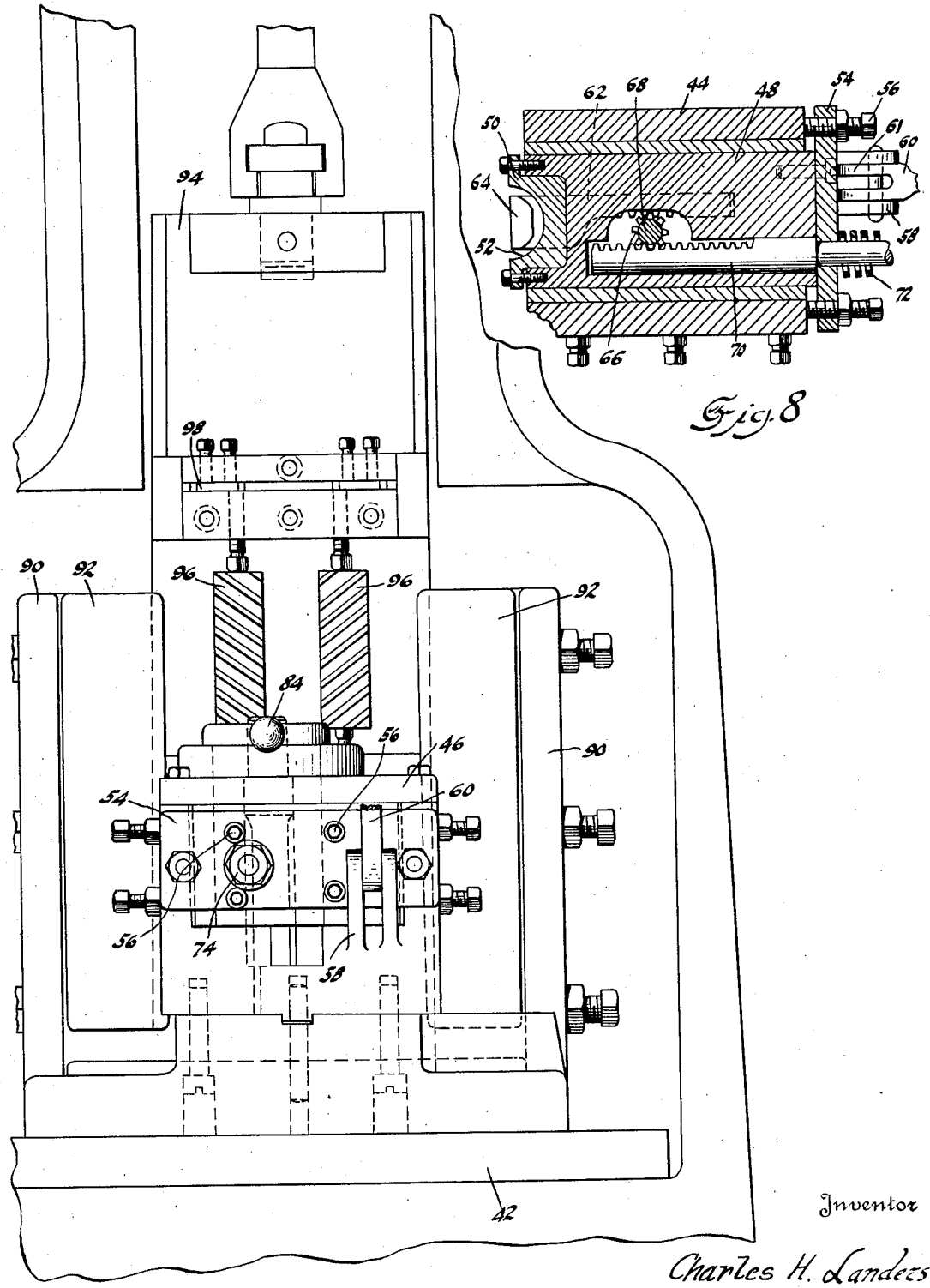
Inventor
Charles H. Landers

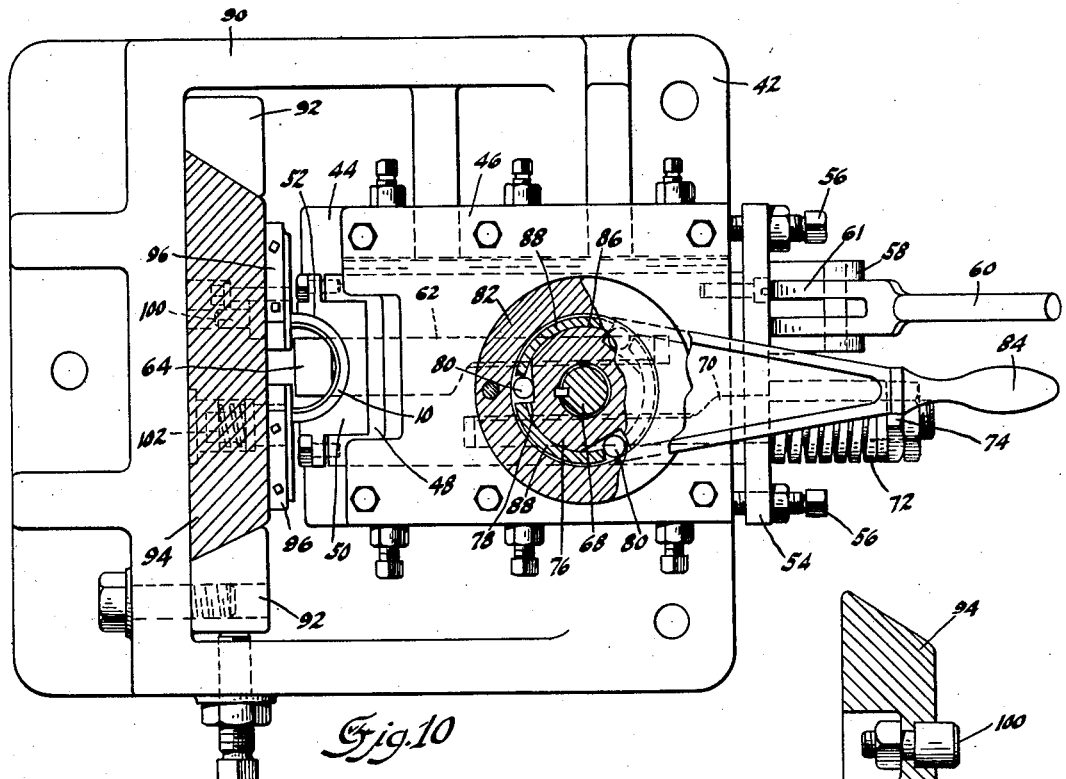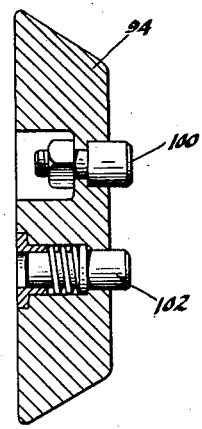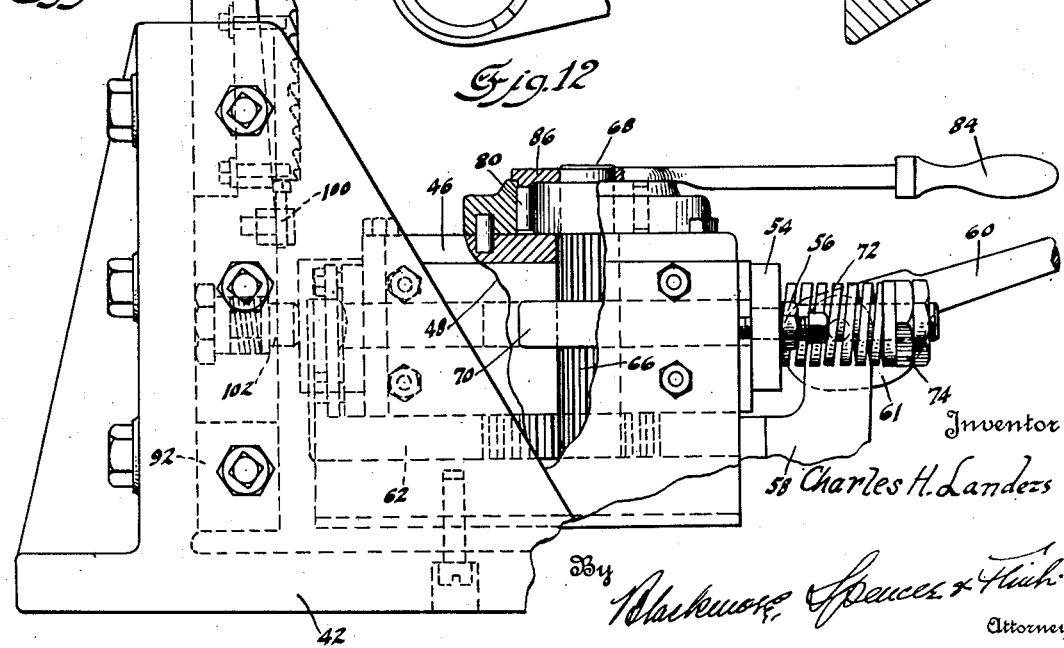

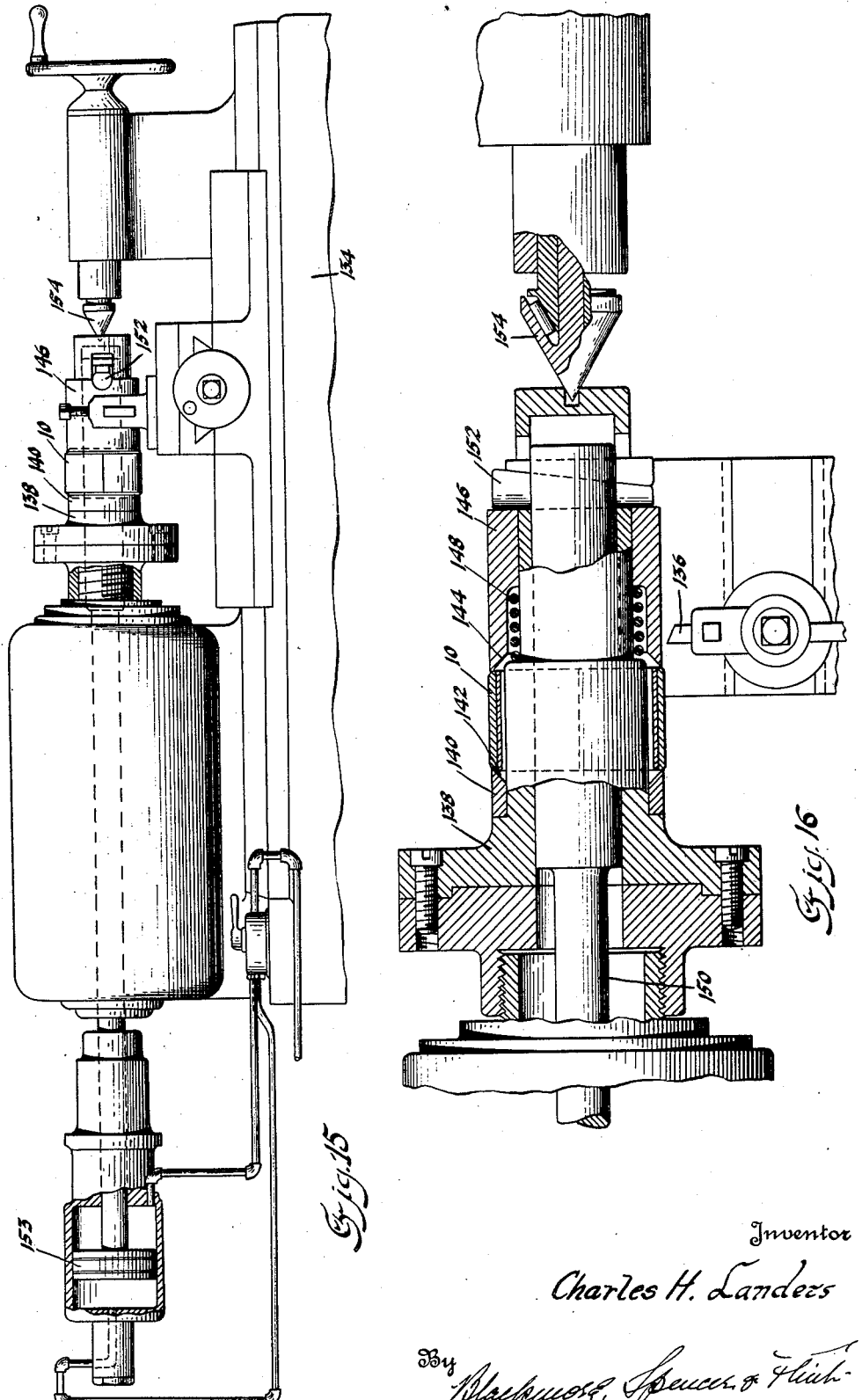

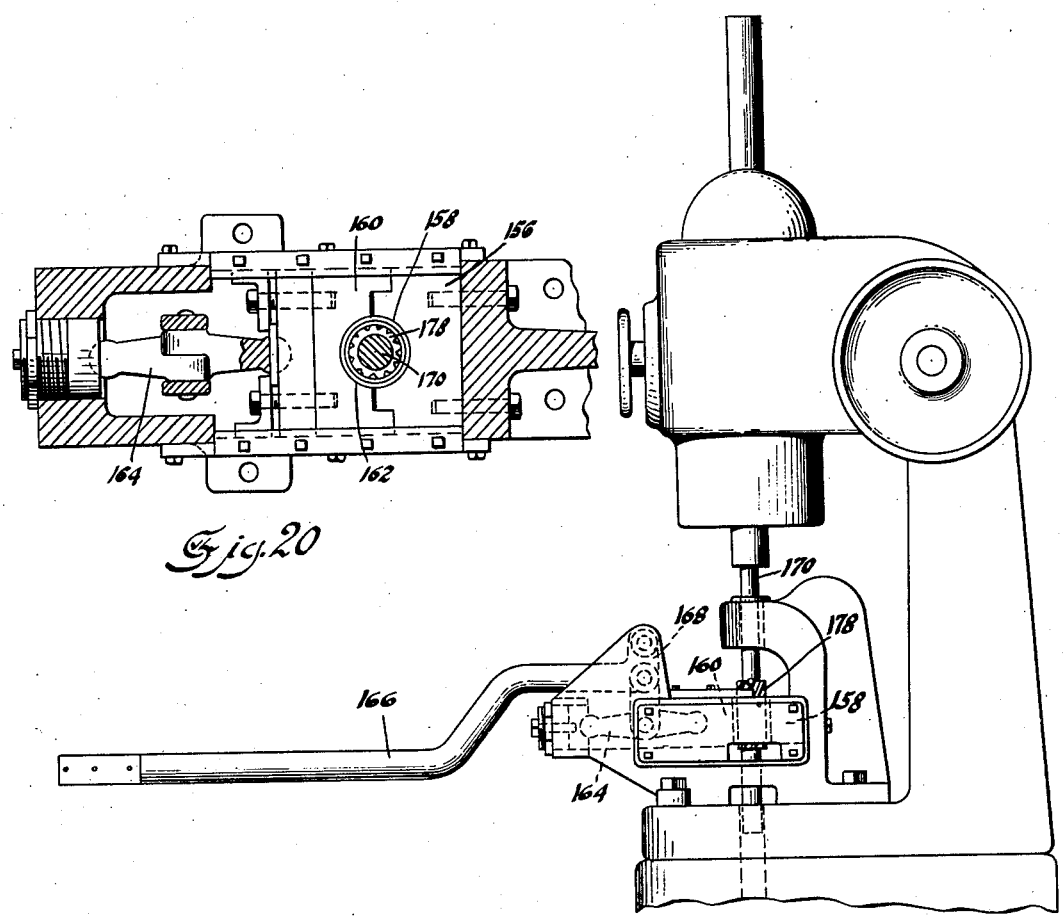
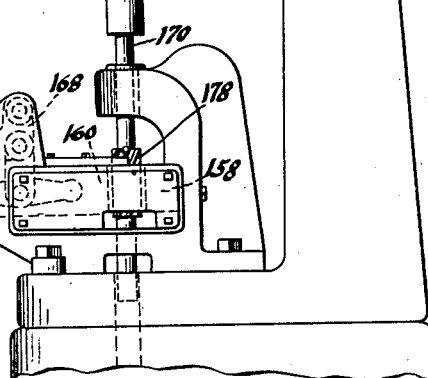
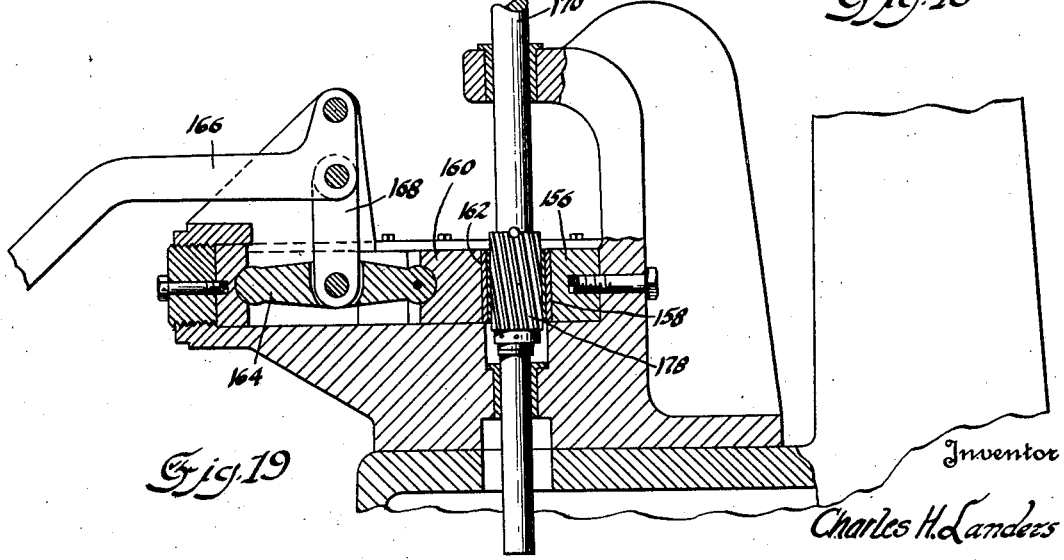

Patented June 3, 1930

1,761,926

UNITED STATES PATENT OFFICE

CHARLES H. LANDERS, OF LANSING, MICHIGAN, ASSIGNOR TO GENERAL MOTORS CORPORATION, OF DETROIT, MICHIGAN, A CORPORATION OF DELAWARE

PROCESS OF MAKING BEARINGS

Application filed January 23, 1928. Serial No. 248,842.

This invention relates to the manufacture of bearings of the interchangeable type commonly used on automobile engines and is an outgrowth of the process described and claimed in my prior application, Serial No. 81,766 filed January 16, 1926.

As in my prior application, the bearing back is formed from sheet metal, such as brass or steel, by cutting it to length and forming it up into the shape of a half bearing. The next step is tinning the back. It is desirable that the tin adhere only to the inside of the back for a coating of tin on the outside would prevent the back from seating accurately in the holders in which it is mounted for subsequent machining operations. To accomplish this the outside of the back is first coated with a material such as powdered graphite, which will prevent the adherence of the tin. This coating may be simply accomplished by wiping a bearing over a bit of felt impregnated with flake graphite. The inside of the back is now wiped with acid and it is dipped in a bath of tin producing a coating of that metal on the inside of the back only. The next step is babbitting. This may be done in the manner described and claimed in my prior application, but I prefer to make use of die casting rather than centrifugal casting because the babbitt may be more quickly cooled, this resulting in the production of finer crystals of copper-tin and tin-antimony and a better distribution of the crystals throughout the bearing. I thus secure a stronger and more uniform bearing surface. The die casting operation follows well-known practices; the bearing backs are mounted in a holder and applied to the die of a die casting machine and molten babbitt is forced into the space between the die and the back. The die is water cooled so that the babbitt is quickly chilled giving the desired crystalline structure.

The next operation is machining the parting line, that is, the meeting edges of the bearing halves. This must be done accurately for the parting line is used as the reference surface in all subsequent operations. Broaching is preferably used for this step. To insure an accurate cut the bearing half is mounted in a fixture which permits it to center itself to the broaching tool. If desired, the parting line may be chamfered at the same time.

The next step consists in boring the halves, trimming them off to length and bevelling the ends. These operations may all be performed on one machine. This may be accomplished by placing a pair of bearings together and mounting the cylinder thus formed in a holder within which rotates an arbor carrying a cutter for the inside boring as well as spaced cutters for trimming the cylinder to length and bevelling its ends. The cutting to length is governed by stops on the machine, thus insuring accuracy.

The next operation is outside turning. This is accomplished in substantially the same manner shown in my prior application. Thus, a pair of bearing halves is clamped between two cup-like members having clamping surfaces engaging the chamfered ends of the bearings. While so held a turning tool or grinding wheel is applied to the exteriors of the bearings. I prefer turning to grinding because the former is sufficiently accurate and may be more quickly accomplished.

Following this, oil holes are drilled in the bearing halves and oil grooves are milled therein, all of which is usual practice.

While the bearing may be used in its present form, if desired, a finish line reaming operation is preferably added. This consists in clamping a pair of bearing halves in a holder so that they are forced to assume substantially the same position as when clamped in place in the engine crankcase. While thus held a reamer piloted at both ends is passed through the bearing removing all excess material. This corrects for any errors in wall thickness which may have crept into the bearing during prior operations.

The resulting article is superior to that produced by the preferred form of process disclosed in my prior application in that a better bearing surface is obtained because of the superior crystallographic structure of the die cast metal and also because of the greater accuracy made possible by the use of the parting line as the reference surface and by the employment of the improved machinery herein disclosed.

My process likewise involves fewer operations and these are simple in character and can be quickly performed.

Figure 1 is an end view of the formed bearing back.

Figure 2 is a diagrammatic view showing the coating of the back with material to which tin will not adhere.

Figure 3 is a view showing the treating of the inside of the back with acid.

Figure 4 is a section through the babbitting apparatus illustrating the bearings in place to receive the babbitt.

Figure 5 is a vertical section through the babbitting machine.

Figure 6 is a front view of a portion of the same machine.

Figure 7 shows a front elevation of the broaching machine.

Figure 8 is a horizontal section through the bearing clamping portion of the broaching machine.

Figure 9 is a partial side elevation of the broaching machine.

Figure 10 is a top plan view of the broaching machine with the slide shown in section.

Figure 11 is a section through the slide showing the stops for engaging the ends of the bearing blank.

Figure 12 is a bottom elevation of the operating lever for the bearing clamping mechanism of the broaching machine.

Figure 15 is an elevation of the machine for turning the outside of the bearing blanks.

Figure 16 is an enlarged sectional view of a portion of the machine shown in Figure 15 showing the bearing halves in place to be acted on by the outside trimming tool.

Figure 17 is a diagrammatic view of the press used to set the bearing to the proper radius of curvature.

Figure 18 is a side elevation of the machine for reaming the inside of the bearings.

Figure 19 is a vertical section through the machine of Figure 18.

Figure 20 is a horizontal elevation through the bearing holding mechanism of the machine shown in Figure 18.

Figure 13:
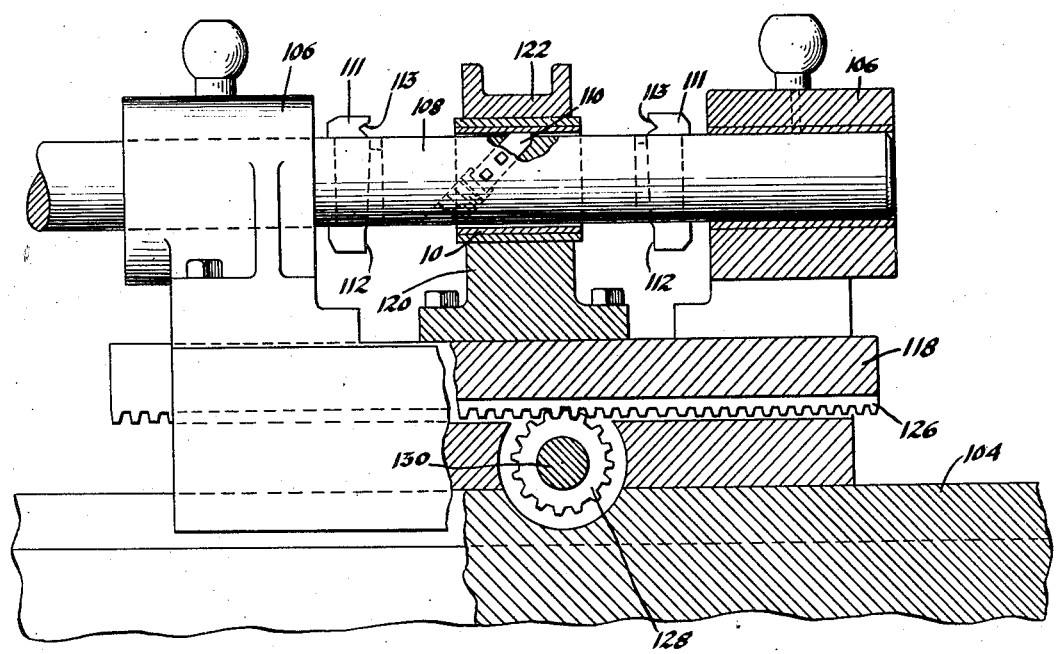
Figure 13 is a side elevation, partly in section, of the machine for boring the interior of a pair of lined bearings and trimming the ends thereof.

In Figure 1 I have shown a strip of sheet metal 10 formed up into the shape of a half bearing. This may be done in the manner described and claimed in my prior application, by shearing a blank of sheet brass or steel to the proper size and shaping it in a coining press.

As a result of these operations the formed blank has a substantially true radius of curvature throughout and the parting line is within approximately .005″ of finished dimensions. A fairly accurate parting line is desirable at this time so that the blank may be fitted to the die casting machine (to be later described) with sufficient snugness so that babbitt will not be squeezed out along the line of contact of the parting line and the die.

While the blank might now, if desired, be machined to exact size I prefer to first line the blank with soft bearing metal, usually babbitt. Before applying the babbitt it is best to coat the back with tin to facilitate the bonding of the babbit to the back. This is usually done by dipping the backs in a pot of molten tin. In my process, it is important that the tin be confined to the inner surface of the bearing only for its adherence to the outer surface will prevent the back from seating accurately in the holders used in subsequent machining operations. I have found that if portions of the back are coated with graphite, tin will not adhere to them. Accordingly, I coat the backs of the bearings with graphite, preferably in flake form. This operation is illustrated in Figure 2 where the bearing back 10 is shown being rubbed over a pad 12 impregnated with flake or powdered graphite. The pad is shown lying in a pan 14 to which graphite may be supplied from time to time. Next, the interior of the back is wiped with acid to remove all particles of graphite which may accidentally have lodged thereon, as well as to clean the surface for the better reception of the tin. This may be accomplished by the use of a swab 16 as shown in Figure 3. The backs are now placed in a wire basket, not shown, and immersed in a tin pot from which they emerge with a coating of tin on the inner surface, but none on the outer surface because of the presence of the graphite.

Next the backs are babbitted. This is preferably done by die casting to secure the preferred crystalline structure before referred to. The die casting is done with the aid of a machine known in the trade as a Chadwick die casting machine and commonly used in lining connecting rod bearings and bearing backs with babbitt.

Figures 4 to 6 illustrate the babbiting operation. A pair of tinned bearing backs 10 are mounted in a holder 18 comprising a pair of pivoted members 20 each equipped with a pair of jaws 22 cooperating with corresponding jaws on the other member to receive the backs between them. With the backs thus gripped in the holder, they are applied to the dies 24 of the die casting machine, the parting lines engaging the surfaces 26 on the dies. The tops and bottoms of the backs are clamped between cooperating members 28 and 30, the former being fixed and the latter actuated by suitable mechanism 69 which need not be described in detail as it forms no part of the present invention. With the backs clamped to the dies, pump 32 is actuated to force molten babbitt from the pot 34 upwardly into the space between the dies and the backs. The dies 24 as well as members 28 are water-cooled, as indicated by passages 36, and when the babbitt has sufficiently solidified,— this requiring but a few seconds,—the clamping member 30 is withdrawn, the dies 24 are elevated, and the lined bearings are ripped off the dies with the aid of suitable tongs. The dies are provided with relieved portions 40 for permitting the tongs to engage the edges of the bearings.

The bearing halves are now of approximately the shape and dimensions of a finished bearing and are provided with a lining of soft bearing metal. The lining is of superior wearing qualities because of the smaller size and better distribution of the tin-antimonide crystals resulting from the employment of die casting and the quick chilling which that process permits. A better bond is likewise secured where die casting is used because this makes possible a less time interval between tinning and babbitting. With die casting, owing to the simple manipulations involved, but little time is consumed in transferring the back from the tin pot to the die casting machine so that the tin has no opportunity to cool and oxidize to an extent to interfere with bonding.

The remaining steps of my process have to do with machining the bearings to exact finished size so that they may be used interchangeably in the assembly of motors. I prefer to make machining of the parting line the first of these operations so that this line may be taken as the reference surface for subsequent machining. This operation may be performed by milling, grinding or broaching, but I prefer the latter.

The apparatus used for performing the broaching operation is illustrated in Figures 7 to 12. 42 represents the base of the machine. Between spaced guides 44 on the machine and beneath a cover plate 46 connecting the guides is mounted a slide 48 carrying at its forward end a holder 50 machined at 52 to accurately fit the outside of a formed half bearing. To the outer end of the slide 48 is secured a plate 54 equipped with adjustable stops 56 adapted to engage the outer ends of the guides 44 and limit the inward movement of the slide. On the base 42 is mounted a bracket 58 to which is pivoted lever 60 having a cam 61 at one end to engage the plate 54 and lock the slide 48 in its innermost position.

Within the slide 48 is slidably mounted clamping member 62 having its free end 64 up-turned and adapted to engage the inner surface of the bearing half. The shank of the member 62 is provided with teeth for engagement by pinion 66 carried by shaft 68 journalled in the cover plate 46. Above the member 62 there is slidably mounted in the block 48 a member 70 provided with rack teeth for engaging the teeth of the pinion 66. The member 70 projects through the plate 54 and is encircled by a coil spring 72 bearing at one end against the plate 54 and at the other end against nuts or other abutments 74 on the member. It will be apparent that upon rotation of the shaft 68 the clamp 62 is positively moved toward the holder 50 while the holder and the member 48 which carry it are yieldingly urged toward the clamp through the action of member 70 and spring 72.

Instead of fastening a handle directly to the shaft 68 to produce this operation I have preferred to interpose a one way clutch between the handle and the shaft. As shown in Figure 10, a disk 76 is keyed to the member 68. The disk is provided with notches 78 for receiving balls 80 forming in conjunction with the surrounding casing 82 carried by the cover plate 46, a common type of ball clutch. The operating handle 84 is provided with a hollow hub 86 slotted to provide spaced fingers 88 fitting between the balls 80. Upon clockwise rotation of the handle 84 the fingers 88 engage the balls 80 and through them rotate the collar 76 and the shaft 68 causing the member 62 and slide 48 to be moved toward each other until the resistance to turning of the shaft 68 becomes great as the bearing half is clamped between the finger 64 and the seat 50 compressing spring 72 whereupon the balls 80 will be forced into wedging engagement between the notches 78 and the interior of the surrounding casing 82 locking the parts in clamping position. When the handle 84 is moved in counter-clockwise direction the fingers 88 knock the balls 80 out of wedging engagement with the casing 82 and through them cause counter-clockwise rotation of shaft 68 and return of the member 62 and the slide 48 to their original positions.

From the base 42 arise standards 90 provided with guides 92 between which slides a member 94 carrying broaches 96 and cutters 98 for trimming the parting line of the bearing. The slide 94 likewise carries fixed stop 100 and spring-pressed stop 102 positioned to engage the edges of the bearing 10, as shown in Figure 10. These stops are located below the broaches and function to properly center the bearing to receive the cut. The operation of this apparatus is as follows:

With the slide 94 and broaches 96 in the position illustrated the operator inserts a half bearing 10 between the members 50 and 64 and shoves handle 60 downwardly moving slide 48 forward until the edges of the bearing, that is, the parting line, engage the stops 100—102 and locking the slide in that position. As the bearing is not clamped at this time it is free to adjust itself in the seat 52. The next operation consists in swinging the lever 84 in clockwise direction causing the part 64 to engage the inner surface of the bearing 10 and clamp it in the seat. Further movement of the operating handle results in locking the parts in position. With the bearing clamped in place, the slide 94 is now moved downwardly and the broaches trim the edges of the bearing. Following this, the cutter 98 engages the outer corners of the bearing and bevels them. This done, the slide 94 is returned to its original position, the handle 84 is moved in counter-clockwise direction releasing the member 64 from clamping engagement with the bearing, the lever 60 is swung upwardly and the bearing half is removed from the machine. By performing the operation in the manner described, it is apparent that the bearing 10 is afforded opportunity to properly seat itself prior to being clamped in position. This assures a more accurate cut and a more accurate final product for the reason that the outside diameter of the bearing is the one which determines the accuracy of fit in the crankcase and it is this same surface that is used as a reference surface in seating the bearing in the machine.

By making stops 56 adjustable, it is possible to adapt the machine for bearings of different wall thicknesses and by making the seats 50 removable it is possible to adapt the machine for bearings of different diameters. Obviously, the operating means for the clamping member 62—64 is such that it adapts itself to various sizes of bearing.

I call particular attention to the fact that the broaches 96 are provided with bevelled cutters. This is important for the reason that it makes it unnecessary to move the bearings away from the cutters on the return stroke. With the cutters horizontal, the metal shaved off the edges of the bearings would tend to wedge between the cutters and the edges of the bearing on the return stroke and mar or deform the latter. By employing bevelled cutters, the shavings fall by gravity out of the cutting zone so that this difficulty is avoided.

Figure 14:
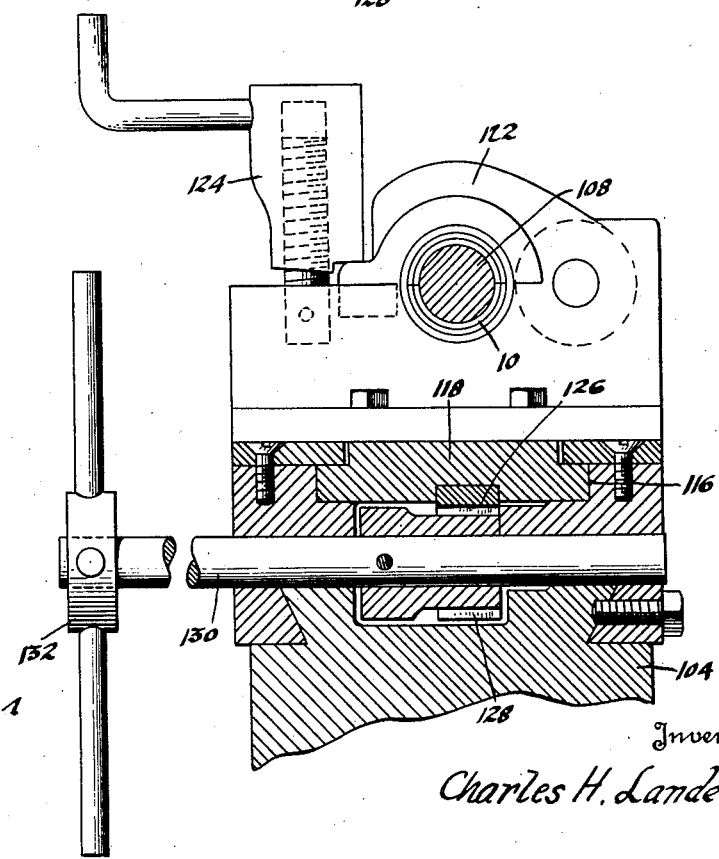
Figure 14 is a vertical section through the machine shown in Figure 13.

The next machine to be described performs a series of operations on the bearings. With this apparatus the inside of the bearing is machined and first one end and then the other is trimmed to length and chamfered. The apparatus is illustrated in Figures 13 and 14. 104 indicates the base of the machine which carries spaced bearings 106 for a rotating shaft 108 carrying cutter 110 for inside turning and spaced cutters 111 bearing blades 112 for trimming to length and blades 113 for chamfering. Upon the base 104 are arranged guides 116 within which slides member 118 carrying bearing 120 having a hinged portion 122 which may be locked to the lower half by clamping member 124. The slide 118 carries rack 126 engaged by pinion 128 carried by shaft 130 rotated by handle 132.

In the operation of this device the clamping member 122 is swung to open position and a pair of bearing halves are inserted in position surrounding the shaft 108. The member 122 is then swung down and locked in place. Shaft 108 is then rotated and with the parts in the position shown in Figure 13, the interior of the bearings is bored. During this operation the slide 118 is advanced along the shaft either manually or automatically so that the entire inner surface is machined. After this has been completed, the handle 132 is manipulated to move the slide 118 and the bearings carried thereby into engagement with first one and then the other of the cutters 112 and 113 for trimming to length and chamfering the ends. The machine is preferably provided with fixed stops to limit the extent of the last-named cuts. The slide 118 may then be moved to its other extreme position where the other end is trimmed.

While this operation has been described as though the interior boring were the first operation to be performed, it will obviously be found most convenient to start with the slide 118 at one of its extreme positions, trim one end, move the slide to its intermediate position for the interior boring and then move it to its other extreme position for the chamfering. The bearings are at this time removed from the holder and new bearings substituted and the operation repeated in reverse sequence.

The next operation consists in the outside turning. To accomplish this the apparatus shown in Figures 15 and 16 is employed. This consists of a bed plate 134 upon which is mounted a cutter 136 adapted to be moved along the work either manually or automatically. The bearings 10 are mounted on a revolving shaft 138 driven by any suitable means and provided with a collar 140 having a bevelled surface 142 for engaging the similarly bevelled surfaces on the ends of the bearings 10. The corresponding surfaces at the other ends of the bearings are engaged by bevelled surface 144 carried by sliding clamp 146 normally urged away from the bearings by coil spring 148 as shown. The shaft 138 is hollow and within it reciprocates ram 150 provided at its one end with wedges 152 for engaging the clamping member 146, and locking it against the bearings. 10. The ram 150 is provided at its other end with a piston 153 operating in a suitable cylinder and adapted to be actuated by air pressure to effect the clamping action. The free end of the shaft 138 is engaged by a pilot bearing 154, preferably mounted on anti-friction bearings so as to prevent any flexing of the shaft and consequent inaccuracy of the cut.

In operation the ram 150 is moved to the right carrying with it the wedges 152 and releasing the clamp 146 which is now moved by its spring 148 to the right. A pair of half bearings may now be inserted, the ram 150 is now moved to the left clamping the bearings in position, the shaft 138 is rotated and by moving the cutter 136 along the bearing the desired cut is made.

The resulting bearing will now be found to be satisfactory for most uses. It has been lined with babbitt, machined to exact parting line dimension, chamfered at the parting line, interiorly bored, machined to length and chamfered at its ends, and exteriorly turned. At this stage the bearing should have the exact curvature necessary for it to fit properly in its seat. However, to overcome any possible spring back and insure that it shall have the proper radius of curvature, I may now place the back in a die block such as shown at 200 in Figure 17 and give it a blow with a plunger 202 having a flat face 204 for engaging the parting line of the bearing.

In some cases, in order to insure absolute interchangeability, I may add the interior reaming operation shown in Figures 18 to 20. In this operation the bearing is clamped in a holder corresponding to the bearing seats in the crankcase and the interior is subjected to second boring operation. The apparatus consists of a fixed block 156 provided with a seat 158 to receive a half bearing. With the fixed block operates a sliding block 160 having a seat 162 complementary to the seat 158. A toggle 164 operated by lever 166 and link 168 moves the block into clamping position. When in this position the seats 158 and 162 are concentric with the axis of shaft 170 carrying milling cutter 178. While thus held the half bearings are milled to exact dimensions thus taking care of any variance in wall thickness which may have developed during the process of manufacture. The toggle clamping means is employed to duplicate the clamping effect produced when the bearings are clamped in their seats in the crankcase.

I claim:

1. The method of making lined bearings, which consists in providing a back having the shape of a finished bearing segment, coating the interior only of said back with tin, applying a lining of babbitt to the tinned interior of the back, trimming the back to substantially finished dimensions at the parting line, assembling two blanks to form a cylinder and boring the interior of the cylinder to finished dimensions.

2. In the combination as defined in claim 1, the additional step of turning or grinding the exterior of the cylinder to finished outside dimensions.

3. In the combination as defined in claim 1, the additional step of trimming the cylinder to length and chamfering the ends thereof.

4. In the combination as defined in claim 1, the aditional steps of trimming the cylinder to length, chamfering the ends thereof, mounting the cylinder in a holder having conical surfaces for engagement with the chamfered surface and machining the exterior of the cylinder.

5. The method of machining a bearing which consists in providing a pair of bearing segments, each of substantially the shape of a half bearing, assembling the segments to form a cylinder, turning the inside of the cylinder and machining it to length, clamping the ends of the cylinder thus formed and machining the exterior thereof.

6. The method of machining a bearing which consists in providing a pair of bearing segments, each of substantially the shape of a half bearing, assembling the segments to form a cylinder, turning the inside of the cylinder and machining it to length and chamfering the ends thereof, holding the cylinder by engagement with said chamfered ends and machining the exterior thereof.

7. In the combination as defined by claim 6, clamping the bearing halves in the position which they would assume in use and reaming the interior of the cylinder thus formed.

8. The method of making lined bearings which consists in providing a back having the shape of a finished bearing segment, coating the outer surface of the back with material to which bonding metal will not adhere, and dipping the back in bonding metal to provide a layer of the metal on the inner uncoated surface only, securing soft bearing metal to the surface coated with bonding metal, and machining the bearing to finished dimensions using the uncoated outer surface as the reference surface for the subsequent machining.

9. The method of making lined bearings which consists in providing a back having the shape of a finished bearing segment, cleaning the inner surface of the back, coating the outer surface of the back with material to which bonding metal will not adhere, applying molten bonding metal to the inner surface of the back, providing a coating of babbitt on the metal coated inner surface, trimming the parting line ends of the blank to finished dimensions and machining the lined bearing, employing the parting line dimension as the reference dimension for subsequent machining.

10. The method of making lined bearings which consists in providing a back having the shape of finished bearing segment, coating the outer surface of the back with material to which bonding metal will not adhere, dipping the back in molten bonding metal to provide a coating on the inner surface thereof, casting soft bearing metal upon the bonding metal, and machining the bearing to finished dimensions employing the outer surface of the bearing as a reference surface.

11. The method of making lined bearings which consists in providing backs each having the shape of a finished bearing segment, coating the exteriors of the backs with material to which bonding metal will not adhere, dipping the backs in molten bonding metal to provide a coating of the metal on their inner surfaces, casting a layer of bearing metal on the bonding metal, machining the backs at the parting line to finished parting line dimensions, mounting a plurality of the backs together to form a cylinder, and performing the subsequent boring and grinding operations on the cylinder thus formed.

12. The method of making lined bearings which consists in providing backs each having the shape of a finished bearing segment, coating the exteriors of the backs with material to which bonding metal will not adhere, dipping the backs in molten bonding metal to provide a coating of the metal on their inner surfaces, casting a layer of bearing metal on the bonding metal, machining the backs at the parting line to finished parting line dimensions, mounting a plurality of the backs together to form a cylinder, boring the interior of the cylinder thus formed using the uncoated outer surface as the reference surface, and turning the exterior of the cylinder to finished outside diameter.

13. The method of making lined bearings, which consists in providing a back having the shape of a finished bearing segment, coating the interior only of said back with tin, applying a lining of babbitt to the tinned interior of the back, trimming the back to substantially finished dimensions at the parting line, assembling two blanks to form a cylinder, boring the interior of the cylinder to finished dimensions, trimming the cylinder to length, chamfer the ends thereof, mounting the cylinder in a holder having conical surfaces for engagement with the chamfered surface and machining the exterior of the cylinder, clamping the bearing halves in a holder so that they assume substantially the same position as when in use and reaming the interior of the cylinder thus formed.

14. The method of making lined bearings which consists in providing a back having the curvature of a finished bearing, coating the outer surface of the back with material to which bearing metal will not adhere, exposing the back to molten bearing metal to provide a layer of the metal on the inner uncoated surface only, and machining the bearing to finished dimensions.

15. A method of making lined bearings which consists in providing a back having the curvature of a finished bearing, coating the outer surface of the back with material to which bearing metal will not adhere, exposing the back to molten bearing metal to provide a layer of the metal on the inner uncoated surface only, securing soft bearing metal to the coated surface and machining the bearing to finished dimensions using the uncoated surface as a reference surface.

16. The method of making lined bearings which consists in providing a back having the curvature of a finished bearing, coating the outer surface of the back with material to which bearing metal will not adhere, exposing the back to molten bearing metal to provide a layer of the metal on the inner uncoated surface only, trimming the back to substantially finished dimensions at the parting line, assembling two blanks to form a cylinder and boring the interior of the cylinder to finished dimensions.

17. In the combination as defined in claim 16, the additional step of turning or grinding the exterior of the cylinder to finished outside dimensions.

18. In the combination as defined in claim 16, the additional step of trimming the cylinder to length and chamfering the ends thereof.

19. In the combination as defined in claim 16, the additional steps of trimming the cylinder to length, chamfering the ends thereof, mounting the cylinder in a holder having conical surfaces for engagement with the chamfered surfaces and machining the exterior of the cylinder.

In testimony whereof I affix my signature.

CHAS. H. LANDERS.